UNITED STATES PATENT OFFICE.

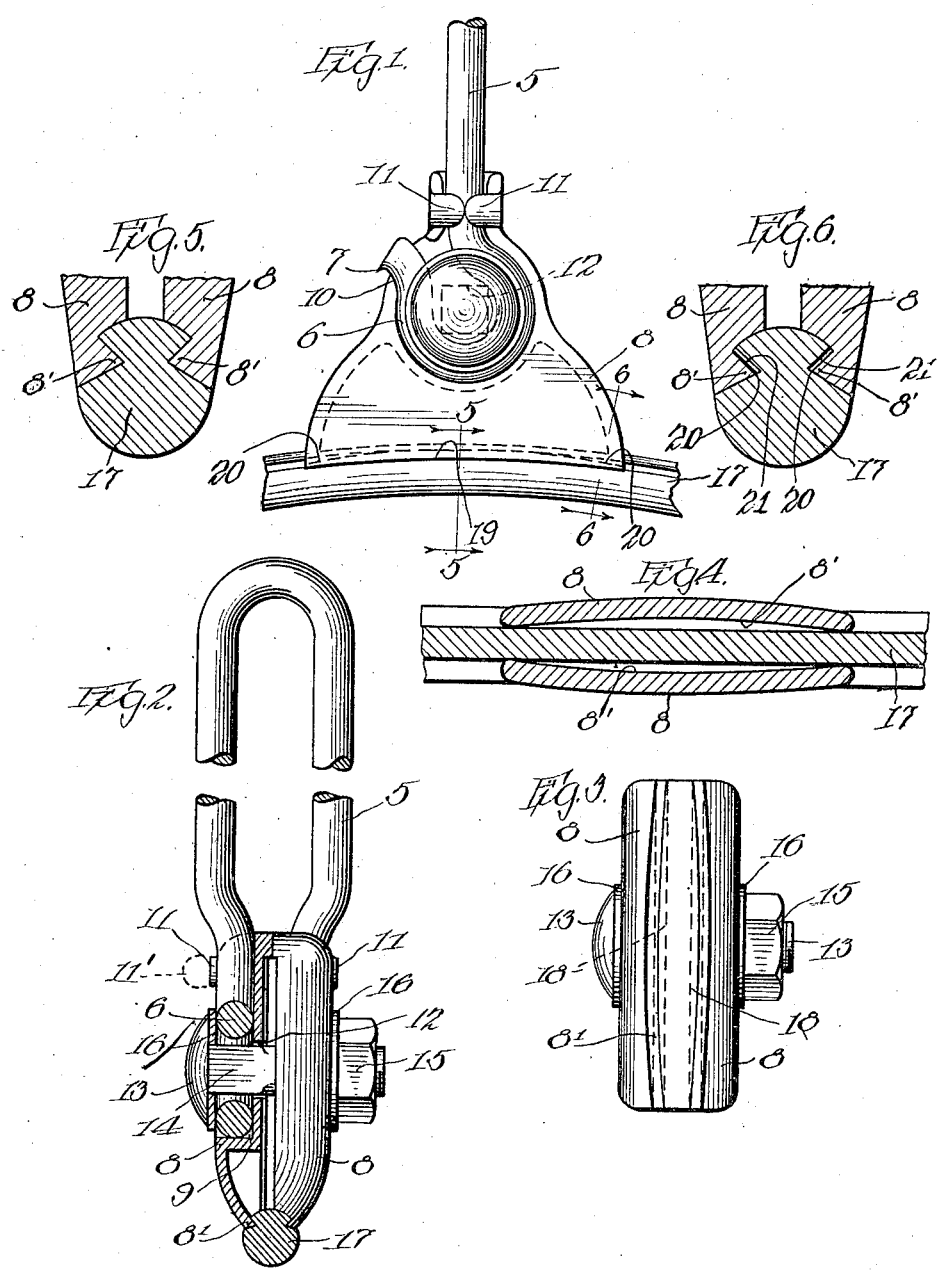

ARTHUR O. AUSTIN, OF BARBERTON, OHIO, ASSIGNOR TO THE OHIO BRASS COMPANY, OF MANSFIELD, OHIO, A CORPORATION OF NEW JERSEY.

WIRE-HANGER.

1,321,078.   Specification of Letters Patent.   Patented Nov. 11, 1919.

Application filed May 24, 1916. Serial No. 99,521.

*To all whom it may concern:*

Be it known that I, ARTHUR O. AUSTIN, a citizen of the United States, residing at Barberton, in the county of Summit and State of Ohio, have invented certain new and useful Improvements in Wire-Hangers, of which the following is a specification.

This invention relates to trolley wire hangers and is more particularly described in connection with that type of a hanger known as a catenary hanger, although it may have a general application to other wire hangers. The invention consists in the features of novelty in the construction, combination, and arrangement of the several parts.

In the drawing, Figure 1 is a side elevation of a portion of a hanger constructed in accordance with the principles of this invention showing the lower edge curved downwardly at the ends and slightly exaggerated in this particular for clearness; Fig. 2 is another view, partly in section, of the hanger showing its application to a trolley wire; Fig. 3 is a view looking at the bottom of the clamping jaws showing their preferred form and construction, and their condition before applied to a trolley wire; Fig. 4 is a sectional view of the clamping jaws applied to a trolley wire, showing the engagement of the jaws before they are drawn tight on the wire; Fig. 5 is an enlarged sectional view taken on the line 5—5 of Fig. 1, when the jaws are tightened; and Fig. 6 is an enlarged sectional view taken on the line 6—6 of Fig. 1, showing a slight space between the jaws and the wire.

The present invention relates to a new construction of clamping jaws whereby they may be more positively drawn into engagement with the trolley wire which they are to support, at the same time leaving a slight space at the ends of the jaws by curving the upper side of the engaging jaws slightly downward at the ends which will allow the wire to bend slightly before it tends to strip from the clamp thereby giving it greater resistance between the ends of the jaws. By curving the jaws outwardly at the center, the tips will engage first but when the trolley wire and the clamping jaws are drawn up tightly, the jaws will engage the trolley wire at the center leaving the ends slightly spaced from the wire. If the wire is very straight and stiff the upper surface of the V-shaped gripping edges of the jaws at the ends (see Fig. 6) will not be in contact with the trolley wire when installed, but the spring of the clamp will tend to press these ends into the wire grooves if the wire bends downwardly, as in the case where it is broken.

In catenary trolley wire construction it is desirable that the clamping jaws be so connected to the hanger proper that the hanger and the jaws may be slipped over the supporting messenger wire and then the jaws clamped about the trolley wire.

In the present invention a hanger member 5 may be of any desired length but it is preferably bent to be supported by a messenger wire and formed with parallel extremities, the ends of which are each formed with a hook 6 having a sharp bend 7 at the extreme end. A pair of clamping members are secured one to each hooked extremity of the hanger. Each of these clamping members 8 is formed with a depression 9 which seats the hook 6 of one extremity of the hanger, and a projection 10 is formed which engages the bent extremities 7 of the hook and tends to prevent the hook from straightening out when any considerable strain or load is placed upon the hanger. In order to hold each hook 6 in its depression 9 each clamping member 8 is formed with bendable lugs 11, one or both of which are bendable from the position indicated by the dotted outline 11' in Fig. 2 to a position over one extremity of the hanger just above the hook 6, as clearly shown in Fig. 1.

Each of the clamping members is formed with an opening 12, preferably rectangular, through which a clamping bolt 13 is inserted having one or more angular portions 14 corresponding to the openings 12. A fastening nut 15 is provided for the threaded end of the bolt, and washers 16 are interposed between the hooks 6 and the head and nut of the clamping bolt so that the hooks will be held firmly in their depressions 9. With this construction the clamping bolt 13 must be entirely removed from the clamping members in order to apply or remove the hanger from the messenger wire, but since the clamping members 8 are attached to the hanger proper by means of the lugs 11, the clamping jaws may be quickly applied to the trolley wire, and by simply inserting the clamping bolt through the opening 12 the clamping jaws may be firmly secured to the trolley wire.

Each clamping member 8 has a substantially V-shaped clamping jaw 8' along the lower edge which engages a corresponding notch of a trolley wire 17, and this jaw is preferably bent outwardly at its center, as shown more clearly in Fig. 3, so that when first applied to a trolley wire the extreme ends of the jaw will be the first parts to contact with the wire. The lower edge 19 of each clamping member 8 is curved downwardly at the ends, so that the jaws 8' when first applied to the wire 17 will engage the groove thereof somewhat as shown in Fig. 4, but when the clamping members are drawn up tight, the jaws will assume a substantially straight line, as indicated by the broken lines 18 in Fig. 3. As the ends of the jaws of the clamping members 8 are lower than their intermediate portion, the ends will not then fill the grooves of the wire, but will leave a space 21, when the wire 17 is substantially straight, the line of contact of the jaws 8' with the wire, in such condition, being indicated by the broken line 20. As shown in Fig. 1, the condition above referred to is slightly exaggerated, for the wire 17 is shown slightly curved, and in practice would be approximately straight or horizontal, but in order to strip the wire from the clamp, as in the case where the trolley wire is broken between the hangers, the space 21 at the ends of the clamping members 8 will first be taken up by the bending of the wire so that the ends of the jaws 8' will engage the upper side of the groove, filling it the same as in Fig. 5. This allows the wire to bend before it is stripped from the clamp, and prevents a sharp bend being formed directly at the ends of the clamping members under ordinary conditions. It is obvious, of course, that although the clamps have been shown with the lower edge curved downwardly, as indicated by the line 19, in Fig. 1, the downward curve of the clamping jaws 8' only at the ends thereof would cause this same effect so that the lower edge of the jaws may be made straight, if desired. If the trolley wire should break on either side of a hanger the curvature of the jaws downwardly at the ends distributes the load more evenly upon the hanger tending to prevent the wire from being stripped from the hanger. As the trolley wire is supported every hundred feet or so the wire very naturally sags to a certain extent between supports. If the lower edges of the jaws are perfectly straight the sag of the wire will naturally cause a bend at the ends of the jaws, but if the jaws are slightly curved downwardly, as shown, they substantially conform to the sag of the wire and prevent an abrupt change or bend which would tend to weaken the wire.

What I claim is:

1. In combination, a wire hanger comprising substantially parallel extremities each formed with a hook curved at the end, and trolley wire clamping members each with a portion to seat one of the hooks and detachably secured to each extremity and held by said hook in wire clamping position and against turning, and means insertible through the hooks for binding the clamping means together.

2. In combination, a wire hanger having substantially parallel hooked extremities, and a wire clamp consisting of a pair of counterpart members one detachably secured to each extremity of the hanger and having a depression to seat the said hooked extremity, thereby holding the members in place against turning and opposite each other, and means insertible through the hooked extremities for binding the members together.

3. In a wire hanger of the class described, a hanger member with hooked extremities; and a wire clamp having members each formed with a depression to seat the hook, a portion of the wall of the depression forming a projection to engage the end of the hook to prevent it from straightening out under load, and means insertible through said extremities for drawing the members together and for holding the extremities in the depressions.

4. A wire hanger comprising a member with substantially parallel partially closed hooked extremities, and a wire clamp comprising a pair of members each formed with a depression to seat one of the hooks and prevent turning and with lugs bendable over the extremities to hold the hooks detachably in the depression, and means insertible through the extremities for additionally holding them in the depressions and binding the members together.

5. In a wire hanger, the combination with a suspension member having parallel partially closed hooks, of wire clamping members each formed with a depression to seat one of the hooks and with lugs to hold the extremity disengageably in the depression, and clamping means only insertible through the hooks to press the members together and to additionally hold the hooks in the depressions.

6. A wire hanger of the class described comprising a suspension member with parallel hooked extremities, a pair of clamping members each formed with a depression to seat one of the hooks and the depression forming a projection to engage the extremity of the hook to prevent the hook from straightening out under load and with bendable lugs to hold the hook in the depression, and clamping means insertible therethrough and engaging the outside faces of the hooks to bind them firmly in their respective depressions when the said members are clamped about a wire.

7. The combination with a hanger having parallel ends, of clamping members each separately secured to one of the ends and having curved wire clamping jaws, and clamping means insertible through the members for straightening out the jaws in clamping a wire and thus gripping a wire more firmly at the ends of the jaws.

8. In a device of the class described, the combination with a pair of clamping members having clamping jaws curving outwardly at the center, and a fastening device for the members adapted to compress the jaws at their central portions in engaging a wire and gripping it more firmly at the ends than at the center.

9. In a trolley wire hanger, the combination with a pair of wire clamping members formed with clamping jaws bent outwardly from each other at the centers, and a clamping device for the members adapted to compress the jaws at their central portions and to substantially straighten the clamping jaws in engaging a wire more firmly at the ends.

10. In a device of the class described, the combination with a hanger having substantially parallel but separable extremities, of a pair of clamping members each separately secured to one of the extremities and having a resilient jaw portion which is rounded outwardly at the center so that the extremities of the jaw portions first and more firmly engage a wire to be clamped, and clamping means for compressing the jaw portions of the said clamping members so that the jaws are substantially in a straight line when in engagement with a wire.

11. In a wire hanger of the class described, a pair of parallel clamping members bowed outwardly at the center and each formed with a jaw with its clamping edge curved downwardly from the center to the ends thereof, and means for clamping the jaws together.

12. In a wire hanger of the class described, the combination with a suspension member, of a pair of parallel clamping members supported thereby each having a jaw bowed outwardly at the center and with the lower edge curved downwardly from the center to the ends thereof and substantially conforming to the curve produced by the sagging of a wire to which it is attached, and means to fasten the clamping members together.

13. In a wire clamping device, the combination with a pair of members each having a jaw portion curved downwardly at the ends and curved inwardly at the ends in the direction of the wire, and means to bind the clamping members together.

14. The combination with a grooved trolley wire, of a hanger therefor comprising jaw members each formed with a jaw curved downwardly at the ends and inwardly toward the wire to engage the grooves of said wire, the curvature of the gripping portion of the jaws conforming to the sag of the wire between supports, and the other curvature of the jaws causing them to engage the wire first at the extremities of the jaws, and means for fastening the clamping members together.

15. In a device of the class described, the combination of a pair of clamping members having clamping jaws curving outwardly at the center so as to increase the grip on the wire at the ends of the jaws, and a fastening device for the members adapted to compress the jaws.

16. The combination with a grooved trolley wire, of a hanger therefor comprising jaw members each formed with a jaw curved downwardly at the ends and inwardly toward the wire to engage the groove of the wire, the curvature of the gripping portion of the jaws tending to distribute the load downward and prevent stripping of the support from a broken wire, and the other curvature of the jaws causing them to engage the wire first at the extremities of the jaws, and means for fastening the clamping members together.

17. The combination with a longitudinally grooved trolley wire, of a hanger therefor comprising jaw members each formed with a V-shaped gripping edge adapted to coöperate with the grooves of the trolley wire, the extremities of the V-shaped gripping portion being bent slightly downward at the extremities, and a fastening device for the members adapted to compress the jaws, the bent extremities leaving a slight space between the grooves of the wire and the extremities of the jaw when the central portions of the jaws are drawn up tightly into the grooves by the fastening device.

18. The combination with a longitudinally grooved trolley wire, of a hanger therefor comprising jaw members each formed with an angular jaw bent downwardly at the ends and the entire jaw being rounded outwardly at the center so that the extremities of the jaws will first engage the grooves of the trolley wire in applying them, and a fastening device for the members adapted to compress the jaws at their central portions, causing the intermediate angular portion of each jaw member to entirely fill the groove of the clamping member and leaving the bent extremities of the jaws with a slight space between them and the adjacent groove of the trolley wire whereby the central or intermediate portions of the jaws mainly support the trolley wire under normal conditions, the said spaces at the ends allowing a slight movement of the wire before the extremities of the jaws are engaged.

19. In a wire hanger, a pair of clamping members, a clamping bolt extending through the members, a suspension member with parallel hooked ends through which the bolt must be inserted and extends, and means for detachably securing each end of the suspension member to the outside of one of the clamping members.

20. In a wire hanger, a pair of clamping members having compressible curved jaws of which the ends engage the wire before the intermediate portions thereof, and a fastening device for the members adapted to compress the jaws in engaging a wire.

21. In a wire hanger, a pair of clamping members, clamping means comprising a bolt extending through the members, a suspension device with parallel end hooks through which the bolt must be inserted and loosely extends, and means for detachably securing the end hooks to the outer faces of the clamping members.

22. In a wire hanger, a suspension member with parallel hook-eyes at the ends, a pair of clamping members each having a depression on the outer side for seating one of the hook-eyes, means for disengageably attaching one end of the suspension members to hold its hook-eye in the depression of one of the clamping members, and clamping means including a bolt which must be inserted through the hook-eyes and through the clamping members to draw them tightly together.

In testimony whereof I have signed my name to this specification, in the presence of two subscribing witnesses, on this 18th day of May, A. D. 1916.

ARTHUR O. AUSTIN.

Witnesses:
A. H. KIRKLAND,
BESS MORTON.

Copies of this patent may be obtained for five cents each, by addressing the "Commissioner of Patents, Washington, D. C."